United States Patent Office 3,661,897
Patented May 9, 1972

3,661,897
18-AMINO-PREGNANES
Ulrich Eder, Hans-Detlef Berndt, Ulrich Kerb, Rudolf Wiechert, and Georg Zollner, Berlin, Germany, and Paul Buchschacher, Arlesheim, Andre Furlenmeier and Andor Furst, Basel, and Marcel Muller, Frenkendorf, Switzerland, assignors to Hoffmann-La Roche Inc., Nutley, N.J.
No Drawing. Filed Apr. 14, 1970, Ser. No. 28,538
Claims priority, application Germany, Apr. 17, 1969, P 19 20 151.5
Int. Cl. C07c 173/10
U.S. Cl. 260—239.55 R    19 Claims

ABSTRACT OF THE DISCLOSURE 13-methylamino steroids, salts thereof and methods for their preparation are described. The aforesaid compounds are valuable medicinals and exhibit a generally favorable activity on heart muscle tone. Their activity results especially in an increasing of the expandability of the heart muscle fibers and thus facilitates, for example, makes possible a sufficient blood filling of the heart.

BRIEF DESCRIPTION OF THE INVENTION

The present invention relates to new 18-aminopregnane steroids and salts thereof of the general formula

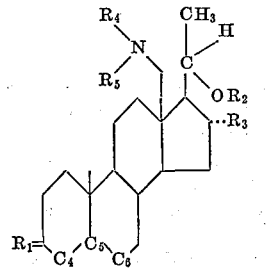

(I)

wherein $R_1$ is

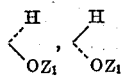

or =O, where $Z_1$ is hydrogen, acyl or alkyl; $R_2$ is hydrogen, acyl or alkyl; $R_3$ is hydrogen or preferably lower alkoxy; $R_4$ taken independently is hydrogen or methyl; $R_5$ taken independently is —$CH_2$—$CH_2$—$OZ_2$, where $Z_2$ is hydrogen or acyl; $R_4$ and $R_5$ taken together are

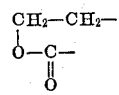

the hydrogen atom at the 5 and/or the 20 position can have an α- or β-configuration; when a 3-keto group is present the carbon atoms $C_4$, $C_5$ can be connected by a carbon-carbon double bond; and when the 3-position is a free or functionally modified hydroxyl group the carbon atoms $C_5$, $C_6$ can be connected by a double bond.

A further aspect of the present invention relates to processes for the preparation of these new 18-aminopregnane steroids.

The acyl groups in the compounds of the present invention are derived from carboxylic acids which are known in the steroid chemistry art to be useful in the esterification of free hydroxyl groups. Particularly preferred are the aliphatic carboxylic acids having from 1 to 12 carbon atoms, such as, for example, formic acid, acetic acid, propionic acid, butyric acid, enanthic acid, caprionic acid, undecyl acid, cyclopentyl propionic acid, succinic acid or esters of carbonic acid.

When $R_2$, $Z_1$ or $Z_2$ are alkyl groups, that is, the hydroxyl group is in etherified form, then the groups are preferably lower alkyl groups, such as for example, methyl or ethyl groups. Also preferred for these substituents are cyclic ether groups such as cyclopentyl-, cyclohexyl- or tetrahydropyranyl groups.

$R_3$ in a preferred embodiment is lower alkoxy, most preferably methoxy or ethoxy.

The compounds of the present invention are valuable medicinals and exhibit a generally favorable activity on heart muscle tone. They are especially active in increasing the expandability of the heart muscle fibers and thereby facilitate or for example make possible, a sufficient blood filling of the heart.

The compounds of the present invention of Formula I may be conveniently prepared by the reductive cleavage of an 18,20-epoxy compound of the general formula

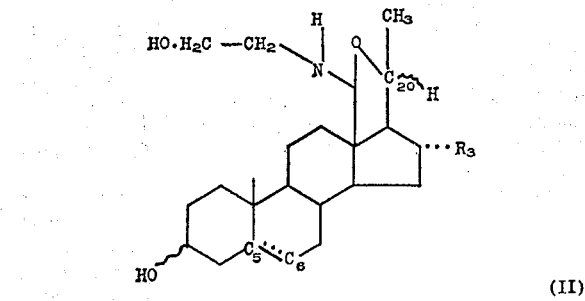

(II)

wherein $R_3$ is hydrogen or preferably lower alkoxy and

is a single or double carbon-carbon bond and the 3-position hydroxyl group as well as the hydrogen atom in the 5- and/or 20-position can have either an α- or β-configuration; so as to obtain a compound of the formula

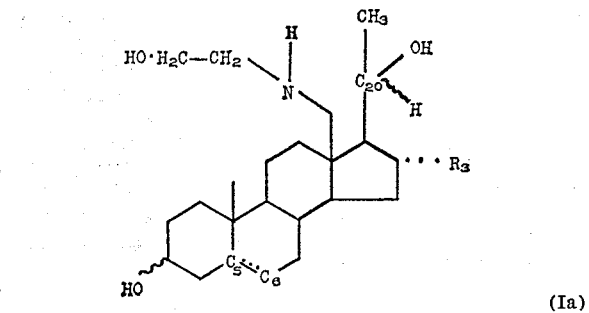

(Ia)

wherein $R_3$ and the meaning of the other symbols are as above.

The above compounds of Formula Ia may be treated with $COCl_2$ or with a carbonic acid ester and if desired the introduced alkoxy carbonyl oxy group in the 3- and/or the 20-position can be saponified to the free hydroxyl group so as to produce compounds of the formula.

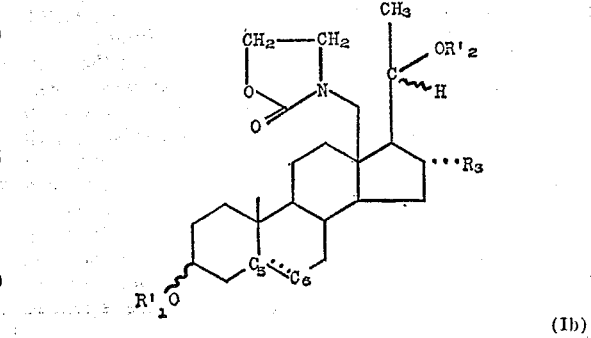

(Ib)

wherein $R'_1$ and $R'_2$ are hydrogen or —OC—O alkyl, where alkyl is preferably methyl or ethyl and $R_3$ and the remaining symbols are as above.

Compounds of Formula Ib above, after first esterifying a free 20-hydroxyl group if present, may be reduced with a complex metal hydride to yield compounds of the formula

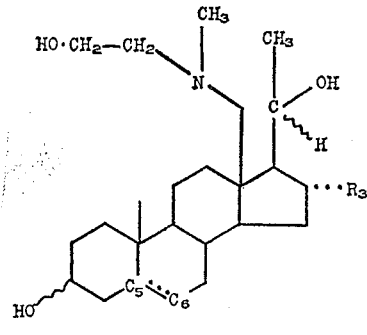

(Ic)

wherein $R_3$ and the other symbols are as above.

It is to be understood that in compounds of Formula Ia, Ib or Ic free hydroxyl groups may be esterified or etherified. Additionally, a 3-position free hydroxyl group may be oxidized to a 3-keto group with simultaneous displacement of a $\Delta^5$ double bond into the 4,5-position. Furthermore, the free base form of compounds of Formula I may be converted into their salts.

The reductive cleavage of the 18,20-epoxy bond to yield compounds of Formula Ia can readily be accomplished utilizing procedures known in the art and employing energetic reaction conditions. The selection of a proper reducing agent is especially to be observed where if the starting material is saturated in the carbon-carbon bond in the 5,6-position or contains a double bond there and if a $\Delta^5$-double bond present in the starting material is also to be retained in the last desired product of the process. If $$C_5 \mathop{=\!=} C_6$$

in the starting material is saturated or if this respective carbon-carbon bond in the final product is saturated then the reductive cleavage of the 18,20-epoxy bond can be conducted under conditions which simultaneously hydrogenate, if necessary, any present $\Delta^5$-double bond. These conditions preferably will include glacial acetic acid as solvent utilizing hydrogen gas in the presence of a noble metal catalyst, such as for example, a platinum catalyst, which if desired can be precipitated onto a customary inert support material. Should, however, an originally present $\Delta^5$-double bond be retained in the final process product, then it is necessary to employ as a reducing agent a complex metal hydride, such as $$Li[AlH_2(OCH_2CH_2—OCH_3)_2]$$

or more preferably lithium aluminum hydride. The use of higher reaction temperatures in the reduction reaction provides beneficial results. A suitable range of reaction temperatures is between about 50–100° C. which will result in a reaction time of between about 1–3 hours. The selection of a solvent is not critical provided that the solvent is inert to the reactants at the conditions employed. Especially useful solvents include benzene, ether, dioxane, anisol, ethylene glycol, dimethyl ether or tetrahydrofuran.

The 18-(N-2-oxo-oxazolidin) ring closure for the compounds of type Ib is accomplished with phosgene or carbonic acid esters. The reaction with phosgene can readily be accomplished at room temperature in a solvent, such as for example, dioxane, tetrahydrofuran or ethylene glycol dimethyl ether and in the presence of a base such as, for example, pyridine or collidine. Generally the reaction is conducted for a period of 3–6 hours. It is immaterial for the reaction whether the 3- and 20-position hydroxyl groups are in the free form or present as acyloxy groups; should free hydroxyl groups become esterified under the reaction conditions employed, they can be saponified utilizing known procedures, such as, for example, employing methanolic potassium hydroxide solution, so as to return them to the free state. The reaction with carbonic acid esters preferably employs diethyl or dimethyl carbonate or also chlorocarbonic acid ethyl ester in the presence of a base at room temperature or also at higher reaction temperatures, such as for example, between about 35–150° C. The carbonic acid ester can also in this embodiment, if desired, be utilized as the solvent. The basic agent can suitably be sodium or potassium methylate, potassium tertiary butylate, potassium tertiary amylate or inorganic bases such as sodium hydroxide or lithium carbonate. Here it should be pointed out that the 3- and 20-position hydroxyl groups, especially under strong reaction conditions such as are shown in the following detailed example, undergo conversion into the aforesaid alkoxy carbonyloxy groups. These groups can be hydrolyzed, however, stepwise if desired.

The preparation of 18-(N-methyl - 2 - hydroxy-ethylamino) compounds of Formula Ic is accomplished by the reductive cleavage of the 18-(N-2-oxo-oxazolidinyl)-ring of the compounds of Formula Ib. The course of this reaction is improved if the 20-position hydroxyl group is in protected form, that is, converted to an acyloxy or alkoxy carbonyloxy group. Suitable reducing agents useful in this reaction include complex metal hydrides, such as especially lithium aluminum hydride or $$Li[AlH_2(OCH_2—CH_2—OCH_3)_2]$$

By employing these reducing agents acyloxy groups present in the molecule react to form free hydroxyl groups. If the reaction is conducted at a reaction temperature in the range of from about 50–100° C. then it is generally desirable to utilize a reaction time in the range of from about 1½ to 4 hours.

The supplementary reactions accompanying the preparation of compounds of Formulas Ia, Ib, and Ic, such as esterification and etherification of free hydroxyl groups or the oxidation of a 3,3-OH group may be accomplished utilizing known techniques. The oxidation of the free hydroxy to a 3-keto group may employ for example the Oppenauer method.

The optional additional step of converting the free base of Formula I into a salt utilizes techniques well known in the art, wherein, for example the base dissolved in an organic solvent, such as ether, dioxane or tetrahydrofuran, is treated with the desired acid such as for example, by bubbling in hydrogen chloride gas. Suitable acids useful in forming salts include, for example, the non-toxic pharmaceutically acceptable acids such as, hydrochloric acid, perchloric acid, sulfuric acid, oxalic acid, acetic acid, benzoic acid and salicyclic acid.

The ready conversion of the compounds of Formula Ia to compounds of Formula Ib and the conversion of compounds of Formula Ib to the compounds of Formula Ic was not predictable. In the case of the oxo-oxazolidine ring closing one could have expected that the ring closure instead of proceeding in the desired direction of Ia→Ib could have proceeded with the inclusion of the 20-position hydroxyl group.

Similarly, the conversion of compounds of Formula Ib to Formula Ic proceeds in a non-predictable and surprising manner. As was indicated already above, the conversion proceeds only in the right direction when the aforesaid 20-hydroxyl group in compounds of Formula Ib is in protected form such as when substituted with acyloxy or alkoxy carbonyloxy groups. Should the 20-hydroxy group be in free form in compounds of Formula Ib, then the indicated reaction conditions do not yield the desired compounds of Formula Ic but rather surprisingly produces a compound having the structure of Formula Ia above.

Thus the reaction steps 1A–1B and 1B–1C represent inventive processes and as such form a part of the present inventive concept.

The preparation of starting materials of Formula II which are otherwise not known may be obtained from corresponding 3-acetoxy-16α-R₃-pregnan-20-ol or 3-acetoxy-16α-R₃-5-pregnen-20-ol utilizing methods well known in the art. For illustration there is provided below the preparation of 18-(2′-hydroxyethylamino)-18,20β-epoxy-5β-pregnan-3β-ol:

A suspension of 90 g. of dried lead tetra-acetate and 30 g. of calcium carbonate in 3 liters of cyclohexane was heated at boiling for 30 minutes. There was then added 24 g. of iodine and a solution of 30 g. of 3β-acetoxy-5β-pregnan-20β-ol (M.P. 137–139° C.) in 500 ml. of cyclohexane and the solution heated with irradiation from a 300 watt lamp for 4 hours under reflux. After cooling, the precipitate was filtered off and the solid washed several times with cyclohexane. The combined organic washes were washed with sodium thiosulfate solution and water, dried, and the solvent was evaporated to dryness. The residue was dissolved together with 50 g. of sodium acetate in 400 ml. of 80 percent acetic acid and heated for two hours on a steam bath. After dilution with water the solvent was sucked off in vacuo, the residue taken up in ether and the ether solution washed with water, bicarbonate solution and water. The isolated crude product (31 g.) was chromatographed on silica gel. There was thus obtained 13.4 g. of 3β-acetoxy-18,20β-epoxy-5β-pregnan-18-ol; M.P. 160–162° C. (hexane).

A total of 10.3 g. of 3β-acetoxy-18,20β-epoxy-5β-pregnan-18-ol was dissolved in 150 ml. of warm ethanolamine. The bath temperature was then raised to 140° C. and over the course of two hours half of the ethanolamine was distilled off in vacuo. The remainder of the ethanolamine was then removed in ten minutes in vacuo, the residue after cooling was taken up in 300 ml. of ether and 200 ml. of water and worked up in the usual manner. There was thus obtained 8.9 g. of 18-(2-hydroxyethylamino)-18,20β-epoxy-5β-pregnan-3β-ol melting at 154–155° C. (ethyl acetate).

The compounds of the present invention are useful as pharmaceuticals and are characterized in having cardiac activity particularly in influencing heart muscle tone. These compounds can be used in the form of conventional pharmaceutical preparations; for example, the aforesaid compounds can be mixed with conventional organic or inorganic inert pharmaceutical carriers suitable for parenteral or enteral administration such as, for example, water, gelatin, lactose, starch, magnesium stearate, talc, vegetable oil, gums, polyalkylene glycols, petroleum jelly or the like. They can be administered in conventional pharmaceutical forms, e.g., solid forms, for example, tablets, dragees, capsules, suppositories or the like; or in liquid forms, for example, solutions, suspensions or emulsions. Moreover, the pharmaceutical compositions containing compounds of this invention can be subjected to conventional pharmaceutical expedients such as sterilization, and can contain conventional pharmaceutical excipients such as preservatives, stabilizing agents, wetting agents, emulsifying agents, salts for the adjustment of osmotic pressure or buffers. The composition can also contain other therapeutically active material.

A suitable pharmaceutical dosage unit can contain from about 10 mg. of the aforesaid compounds of the present invention. Suitable oral dosage regimens in mammals comprise from about 10 mg. per day to about 200 mg. per day. Suitable parenteral dosage regimens in mammals comprise from about 1.5 mg. per day to about 10 mg. per day. However, for any particular subject, the specific dosage regimen should be adjusted according to individual needs and the professional judgment of the person administering or supervising the administration of the aforesaid compound. It is to be understood that the dosages set forth herein are exemplary only and do not, to any extent, limit the scope or practice of this invention.

Example 1

A total of 5.8 g. of 18-(2-hydroxyethylamino)-18,20β-epoxy-5β-pregnan-3β-ol was dissolved in 200 ml. of glacial acetic acid and together with 300 mg. of PtO₂ was hydrogenated at room temperature and normal pressure. Hydrogen up take was 480 ml. The catalyst was filtered off and the solvent evaporated in vacuo. The residue was taken up in 200 ml. of water, made alkaline with concentrated ammonia solution, extracted with methylene chloride and the methylene chloride solution was worked up in the usual manner. There was obtained 5.3 g. of 18-(2-hydroxyethylamino)-5β-pregnan-3β,20β-diol, melting at 156–157.5° C. (ethyl acetate).

Example 2

A total of 3.15 g. of 18-(2-hydroxyethylamino)-5β-pregnan-3β,20β-diol was dissolved in hot 150 ml. diethylcarbonate. After distilling off 20 ml. of diethylcarbonate 50 mg. of sodium methylate was added and the resulting solution was heated at reflux for two hours. The diethylcarbonate was then distilled off in vacuo and the residue was taken up in methylene chloride. After worked up in the usual manner, there was obtained 4.2 g. of 3β,20β-diethoxycarbonyloxy - 18 - (N - 2-oxo-oxazolidinyl)-5β-pregnane melting at 124–127° C. (ethyl acetate).

Example 3

To a suspension of 500 mg. of lithium aluminum hydride in 80 ml. of freshly distilled tetrahydrofuran (THF), there was added dropwise over five minutes a solution of 500 mg. of 3β,20β-diethoxycarbonyloxy-18-(N-2-oxo-oxazolidinyl)-5β-pregnane in 5 ml. of THF. After completion of the addition, the solution was heated at reflux for two hours. Thereafter, the excess lithium aluminum hydride was decomposed with ethylacetate and methanol, the solution was diluted with 200 ml. of ether and together with a solution of sodium potassium tartrate was worked up in the usual manner to yield 256 mg. of 18 - (N-methyl-2-hydroxyethylamino)-5β-pregna-3β,20β-diol, melting at 181–182° C. (isopropyl ether).

Example 4

A total of 50 g. of 3β-acetoxy-5β-pregn-16-en-20-one was dissolved in 1600 ml. of 3 percent methanolic KOH and heated to boiling for one hour. After cooling, the solution was stirred in ice water, the precipitate filtered off and dried. The solid was dissolved in 250 ml. of pyridine and treated with 100 ml. of acetic anhydride. The reaction mixture was allowed to stand for 15 hours at room temperature and was then added to ice water with stirring and the precipitate obtained was washed and dried. The product was chromatographed to remove unconverted starting material. There was obtained 16α-methoxy-3β-acetoxy-5β-pregnan-20-one in a yield of 26.3 g. The reduction of the 20 keto group utilizing NaBH₄ in methanol with an ice-bath was conducted in the usual manner to yield 23.4 g. of 16α-methoxy-3β-acetoxy-5β-pregnan-20α-ol, melting at 145–145° C. (hexane).

The treatment of the 16α - methoxy - 3β-acetoxy-5β-pregnan-20α-ol with lead tetra-acetate/iodine in a manner known per se yielded from 10 grams of the 20α alcohol and after chromatography, 7.1 g. of 16α - methoxy-3β-acetoxy-18,20α-epoxy-5β-pregnan-18-ol, melting at 158–161° C. (hexane).

A total of 6.5 g. of 16α-methoxy-3β-acetoxy-18,20α-epoxy - 5β - pregnan-18-ol was dissolved in 120 ml. of ethanolamine and the solution was heated to 110° C. under a nitrogen atmosphere with vacuum so that the ethanolamine slowly distilled over. After six hours at 110° C., the temperature was raised to 140° C. and the remainder of the ethanolamine was distilled off. The residue was worked up in the usual manner to give 6.1 g. of 16α - methoxy - 18 - (2-hydroxyethylamino)-18,20α-epoxy-5β-pregnan-3β-ol, melting at 111–113° C. (ethyl acetate).

The hydrogenation of 16α - methoxy-18-(2-hydroxyethylamino) - 18,20α - epoxy-5β-pregnan-3β-ol was conducted in analogous fashion to Example 1 as well as the work-up of the reaction mixture. There was thus obtained in 91 percent yield 16α - methoxy-18-(2-hydroxyethylamino)-5β-pregnan-3β,20α-diol, melting at 174.5-176° C. (ethyl acetate).

Example 5

The treatment of 16α - methoxy-18-(2-hydroxyethylamino)-5β-pregnan-3β,20α-diol with diethylcarbonate followed in analogous fashion the procedure described in Example 2. There was thus obtained 16α-methoxy-3β,20α-diethoxycarbonyloxy - 18 - (N - 2 - oxo-oxazolidinyl)-5β-pregnane in a yield of 85 percent; melting at 136–139° C. (hexane).

Example 6

16α - methoxy - 3β,20α-diethoxycarbonyloxy-18-(N-2-oxo-oxazolidinyl)-5β-pregnane was reduced in analogous fashion to the procedure of Example 3. There was thus obtained in 81 percent yield 16α-methoxy-18-(N-methyl-2 - hydroxyethylamino)-5β-pregnan-3β,20α-diol (colorless oil).

Example 7

A solution containing 407 mg. (1 mM.) of 16α-methoxy-18-(2-hydroxyethylamino) - 5 - pregnen-3β,20β-diol (M.P. 212–214° C.) in 25 ml. of diethylcarbonate was treated with 56 mg. of potassium tertiary-butylate and warmed to 50° C. under nitrogen atmosphere for 15 hours. The reaction solution was diluted with 300 ml. of chloroform and then washed three times with 10 percent sodium chloride solution. The aqueous phase was back extracted with chloroform and the combined chloroform extracts were dried over sodium sulfate and then concentrated in vacuo. The resulting crude product, 590 mg. of brown powder, was dissolved in 4 ml. of dichloromethane and placed on a column of 18 g. of silica gel. Elution was accomplished with benzene/acetone 20:1. In the first fractions there was obtained a small amount of non-polar impurity and then 480 mg. (83 percent) of a thin layer chromatographically pure 3β,20β-diethoxy-carbonyloxy-16α-methoxy - 18 - (N-2-oxo-oxazolidinyl) - 5 - pregnene was obtained as a white powder. The product, after recrystallization from dichloromethane/isopropyl ether/hexane, melted at 149–149.5° C.

Example 8

A solution of 1.154 g. (2 mM.) of 3β,20β-diethoxycarbonyloxy-16α-methoxy - 18 - (N-2-oxo-oxazolidinyl)-5-pregnene (M.P. 149–149.5°) and 500 mg. of potassium carbonate in 50 ml. of methanol and 5 ml. of water was heated at reflux under nitrogen atmosphere for two hours. The cooled reaction mixture was neutralized with 1 N hydrochloric acid, the methanol removed in vacuo, the residue taken up in 500 ml. of chloroform and washed three times with 10 percent sodium chloride solution. The aqueous phase was extracted twice with chloroform and the combined chloroform solutions were dried over sodium sulfate and concentrated in vacuo. The residue (1.062 g.) was dissolved in 20 ml. of dichloromethane and chromatographed through a column of 50 g. of silica gel. A non-polar impurity was eluted with benzene/ether 5:1. Elution with benzene/ethyl acetate 3:2 yielded 859 mg. (85 percent) of 20β-ethoxy-carbonyloxy-16α-methoxy-18-(N-2-oxo-oxazolidinyl) - 5 - pregnen-3β-ol which after recrystallization from benzene/isopropyl ether, melted at 123.5–124.5° C. Elution of the column with benzene/ethyl acetate 1:1 yielded additionally 101 mg. of 16α-methoxy-3β,20β-dihydroxy-18-(N-2-oxo-oxazolidinyl)-5-pregnene, melting at 204–205° C.

Example 9

A solution containing 1.15 g. (2 mM.) of 3β,20β-diethoxycarbonyloxy - 16α - methoxy - 18 - (N - 2 - oxo-oxazolidinyl)-5-pregnene (M.P. 149–149.5° C.) and 7.5 g. of potassium hydroxide in 150 ml. of methanol was stirred for 30 hours at room temperature under nitrogen atmosphere. The reaction solution was poured into 400 ml. of 10% sodium chloride solution and extracted four times each with 400 ml. of chloroform. The chloroform extracts were then washed three times with sodium chloride solution, dried over sodium sulfate and concentarted in vacuo; thereby yielding 883 mg. of a golden, semi-crystalline mass. A total of 860 mg. of this crude product was dissolved in 35 ml. of chloroform/acetone ca. 6:1 and chromatographed on a column of 37 g. of silica gel. The non-polar impurity was diluted with benzene/ether 5:1, the desired product, 525 mg. (62 percent) of white crystals, was eluted with benzene/ethyl acetate 1:1. Recrystallization from dichloromethane/methanol/benzene yielded 16α-methoxy-18-(N-2-oxo-oxazolidinyl)-5-pregnen-3β,20β-diol, melting at 206–207° C. The product crystallized in fine white needles containing 0.5 mol of benzene of crystallization.

Example 10

A solution containing 407 mg. (1 mM.) of 16α-methoxy - 18 - (N - 2 - oxo - oxazolidinyl) - 5 - pregnen-3β,20β-diol in 40 ml. of dioxane and 0.5 ml. of pyridine was treated at room temperature with stirring dropwise over a period of 5 minutes with 3.7 ml. (5 mM.) of phosgene/dioxane solution (135 mg. phosgene per ml. dioxane). After about 3½ hours, an additional 7.5 ml. (10 mM.) of the phosgene solution was added dropwise. After 4½ hours, a total conversion was obtained. The reaction solution was poured into 300 ml. of a semi-saturated sodium bicarbonate solution and extracted twice with 400 ml. each of dichloromethane. The organic solution is washed twice with semisaturated sodium bicarbonate solution and 10% sodium chloride solution, then dried over sodium sulfate and concentrated in vacuo. The resulting crude product (483 mg.) was treated with 50 ml. of a 5% methanolic potassium hydroxide solution and stirred for 24 hours at room temperature under a nitrogen atmosphere. The reaction solution was worked up in analogous fashion to the procedure in Example 9 and the crude product chromatographed on silica gel. There was thus obtained 242 mg. of a white, crystalline product which was recrystallized from dichloromethane/methanol/benzene to yield 207 mg. (44%) of 16α-methoxy-18-(N - 2 - oxo - oxazolidinyl) - 5 - pregnen-3β,20β-diol, melting at 204.5–205° C. (fine needles with 0.5 mol of benzene of crystallization).

Example 11

A solution containing 407 mg. (1 mM.) of 16α-methoxy - 18 - (2 - hydroxyethylamino) - 5 - pregnen-3β,20β-diol (M.P. 212–214° C.) and 25 mg. of potassium tertiary butylate in 25 ml. of diethylcarbonate was heated under nitrogen atmosphere at 50° C. for 20 hours. The cooled reaction solution was diluted with chloroform and washed three times with 10% sodium chloride solution. The aqueous phase was back extracted an additional three times with chloroform. The combined chloroform solutions were dried over sodium sulphate and evaporated in vacuo so as to yield a crude product (479 mg.) in the form of a yellow powder and was chromatographed on a column of 19 g. of silica gel. The column was first washed with benzene/ether 5:1 so as to remove a non-polar impurity. Elution with benzene/ethyl acetate 1:1 gave 262 mg. (52%) of pure 3β-ethoxycarbonyloxy-16α - methoxy-18-(N-2-oxo-oxazolidinyl)-5-pregnen-20β-ol. Using the same mixture, there was obtained in later fractions an additional 191 mg. of 16α-methoxy-18-(N-2-oxo-oxazolidinyl)-5-pregnen - 3β,20β - diol which was identical with the material described in Example 9 or 10.

Example 12

A solution of 16.2 g. (40 mM.) of 16α-methoxy-18-(2-hydroxyethylamino) - 18,20β - epoxy-5-pregnen-3β-ol (M.P. 122.5–123° C.) in 250 ml. of absolute THF was added dropwise, over the course of 30 minutes at room temperature and with stirring, to a solution of 15.3 g.

of lithium aluminum hydride in 550 ml. of absolute THF. The temperature rose to 40° C. After completing the addition, stirring was continued for an additional 30 minutes. The reaction mixture was then cooled to −70° C. and carefully treated with 50 ml. of a saturated sodium sulphate solution. The temperature slowly rose to 20° C. and was finally heated at reflux for 30 minutes. The cold suspension was then filtered through sand and the filter cake washed well with THF. The combined filtrates were evaporated in vacuo, the residue taken up in chloroform/ethyl acetate 5:1, washed twice with saturated sodium chloride solution and the aqueous phase was back extracted twice with chloroform. The combined organic extracts were dried over sodium sulphate and concentrated in vacuo. The pure, poorly crystalline, 16α-methoxy-18-(2-hydroxyethylamino)-5-pregnen-3β,20β-diol was obtained as a white powder which melted at 212–214° C.; yield 15.3 g. (94%). The corresponding hydrochloride was crystallized from methanol/chloroform melting at 267–268° C. (decomp.).

Example 13

A total of 5.1 g. of 3β,20β-diethoxycarbonyloxy-18-(N-2-oxo-oxazolidinyl)-5β-pregnane was dissolved in 200 ml. of 3% methanolic KOH and in the presence of a nitrogen atmosphere, heated at reflux for one hour. After cooling, the reaction mixture was stirred into a sodium chloride saturated ice-water solution and the precipitated 20β-ethoxycarbonyloxy - 18 - (N-2-oxo-oxazolidinyl)-5β-pregnan-3β-ol was purified chromatographically; yield 3.2 g.; melting at 233.5–234.5° C. (isopropyl ether).

Example 14

A total of 1.8 g. of 20β-ethoxycarbonyloxy-18-(N-2-oxo-oxazolidinyl)-5β-pregnan-3β-ol was dissolved in 60 ml. of distilled acetone and cooled to 0° C. Together with stirring, 1 ml. of 8 N-chromic acid solution was added and stirring was continued an additional 10 minutes at 0° C. The excess chormic acid was destroyed by the addition of methanol. After work up in the usual manner, there was obtained 1.65 g. of 20β-ethoxycarbonyloxy-18-(N-2-oxo-oxazolidinyl)-5β-pregnan-3-one, melting at 191–193° C. (isopropylether).

We claim:
1. Compounds of the formula

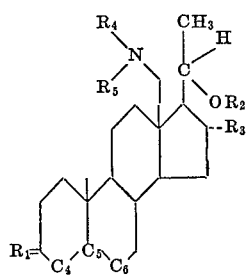

wherein $R_1$ is

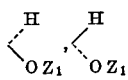

or =O, where $Z_1$ is hydrogen, acyl derived from the aliphatic carboxylic acids having from 1 to 12 carbon atoms and mono esters of carbonic acid with an aliphatic carboxylic acid with from 1 to 12 carbon atoms; or alkyl selected from the group consisting of lower alkyl, cyclopentyl, cyclohexyl or 2-tetrahydropyranyl; $R_3$ is hydrogen or lower alkoxy; $R_4$ taken independently is hydrogen or methyl; $R_5$ taken independently is —$CH_2$—$CH_2$—$OZ_2$, where $Z_2$ is hydrogen or acyl as defined above; $R_4$ and $R_5$ taken together are

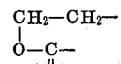

the hydrogen atom at the 5 and/or the 20 position can have an α- or β-configuration; when 3-keto group is present the carbon atoms $C_4$, $C_5$ can be connected by a carbon-carbon double bond; and when the 3-position is substituted with other than a keto group the carbon atoms $C_5$, $C_6$ can be connected by a double bond; and non-toxic, pharmaceutically acceptable acid addition salts thereof.

2. The compounds of claim 1 wherein $R_5$ taken independently is —$CH_2$—$CH_2$—$OZ_2$.

3. The compound of claim 2 which is 18-(2-hydroxyethylamino)-5β-pregnan-3β,20β-diol.

4. The compound of claim 2 which is 18-(N-methyl-2-hydroxyethylamino)-5β-pregnan-3β,20β-diol.

5. The compound of claim 2 which is 16α-methoxy-18-(2-hydroxyethylamino-5β-pregnan-3β,20α-diol.

6. The compound of claim 2 which is 16α-methoxy-18-(N-methyl - 2 - hydroxyethylamino)-5β-pregnan-3β,20α-diol.

7. The compound of claim 2 which is 16α-methoxy-18-(2-hydroxyethylamino)-5-pregnen-3β,20β-diol.

8. The compounds of claim 1 wherein $R_4$ and $R_5$ taken together are

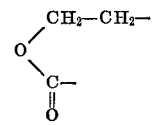

9. The compound of claim 8 which is 3β,20β-diethoxycarbonyloxy-18-(N-2-oxo-oxazolidinyl)-5β-pregnane.

10. The compound of claim 8 which is 16α-methoxy-3β,20α - diethoxycarbonyloxy - 18 - (N-2-oxo-oxazolidinyl)-5β-pregnane.

11. The compound of claim 8 which is 16α-methoxy-3β,20α - diethoxycarbonyloxy - 18 - (N-2-oxo-oxazolidinyl)-5-pregnene.

12. The compound of claim 8 which is 16α-methoxy-20β-ethoxycarbonyl - 18 - (N-2-oxo-oxazolidinyl)-5-pregnene.

13. The compound of claim 8 which is 16α-methoxy-18-(N-2-oxo-oxazolidinyl)-5-pregnen-3β,20β-diol.

14. The compound of claim 8 which is 16α-methoxy-3β-ethoxycarbonyloxy - 18 - (N-2-oxo-oxazolidinyl)-5-pregnen-20β-ol.

15. The compound of claim 8 which is 20β-ethoxycarbonyloxy - 18 - (N-2-oxo-oxazolidinyl)-5β-pregnan-3-one.

16. The compound of claim 8 which is 20β-ethoxycarbonyloxy-18-(N - 2 - oxo-oxazolidinyl)-5β-pregnan-3β-ol.

17. The compounds of claim 1 of the formula

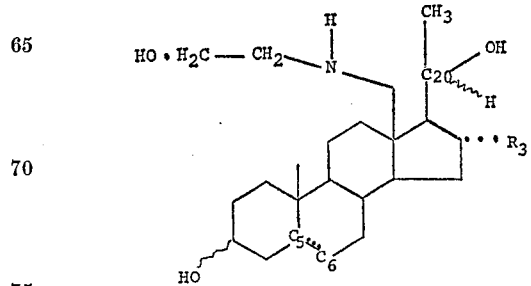

(Ia)

wherein $R_3$ is hydrogen or lower alkoxy and $$C_5 \text{---} C_6$$

is a single or double carbon-carbon bond and the 3-position hydroxyl group as well as the hydrogen atom in the 5- and/or 20-position can have either an α- or β-configuration; and non-toxic, pharmaceutically acceptable acid addition salts thereof.

18. The compounds of claim 1 of the formula

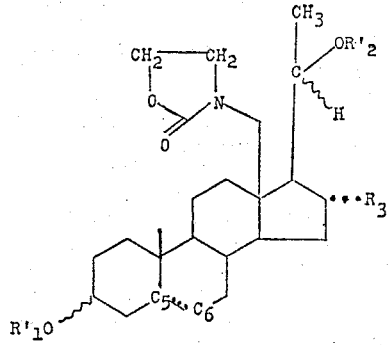

wherein $R'_1$ and $R'_2$ are hydrogen or —OC—O-alkyl, said alkyl selected from the group consisting of lower alkyl, cyclopentyl, cyclohexyl or 2-tetrahydropyranol, $R_3$ is hydrogen or lower alkoxy and $$C_5 \text{---} C_6$$

is a single or double carbon-carbon bond and the 3-position substituent group as well as the hydrogen atom in the 5- and/or 20-position can have either an α- or β-configuration; and non-toxic, pharmaceutically acceptable acid addition salts thereof.

19. The compounds of claim 1 of the formula

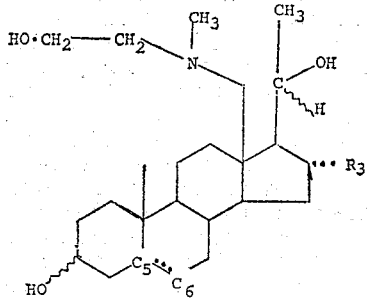

wherein $R_3$ is hydrogen or lower alkoxy and $$C_5 \text{---} C_6$$

is a single or double carbon-carbon bond and the 3-position substituent group as well as the hydrogen atom in the 5- and/or 20-position can have either an α- or β-configuration; and non-toxic, pharmaceutically acceptable acid addition salts thereof.

References Cited
UNITED STATES PATENTS 2,913,455　11/1959　Pappo _____ 260—239.5
3,004,965　10/1961　Kerwin _____ 260—239.5

HENRY A. FRENCH, Primary Examiner

U.S. Cl. X.R.

260—397.4, 397.5, 999

UNITED STATES PATENT OFFICE
CERTIFICATE OF CORRECTION

Patent No. 3,661,897                Dated May 9, 1972

Inventor(s) Eder, Berndt, Kerb, Wiechert, Zollner, Buchschacher, Furlenmeier, Furst and Muller.

It is certified that error appears in the above-identified patent and that said Letters Patent are hereby corrected as shown below:

Claim 12, Column 10, Line 48   "$20\beta$-ethoxycarbonyl-18-(N-2-oxo-oxazolidinyl)-5-pregnene" should be $20\beta$-ethoxycarbonyloxy-18-(N-2-oxo-oxazolidinyl)-5-pregnen-$3\beta$-ol.

Signed and sealed this 3rd day of July 1973.

(SEAL)
Attest:

EDWARD M. FLETCHER, JR.        Rene Tegtmeyer
Attesting Officer                Acting Commissioner of Patents